United States Patent [19]

Douglas

[11] 4,307,705
[45] Dec. 29, 1981

[54] DIRECT FLAME HEATED GRIDWORK

[76] Inventor: Marvin Douglas, 351 13th St., Del Mar, Calif. 92014

[21] Appl. No.: 965,846

[22] Filed: Dec. 4, 1978

[51] Int. Cl.³ .............................................. D01D 1/04
[52] U.S. Cl. ............................................. 126/343.5 A
[58] Field of Search ................ 126/343.5 A; 431/353, 431/354, 351

[56] References Cited

U.S. PATENT DOCUMENTS

| | | | |
|---|---|---|---|
| 1,661,929 | 3/1928 | Deemar | 431/354 |
| 2,227,845 | 1/1941 | Rogers | 126/343.5 A |
| 2,494,260 | 1/1950 | Osmond | 126/343.5 A X |
| 2,773,496 | 12/1956 | Czarnecki | 126/343.5 A |
| 2,898,628 | 8/1959 | Phipps | 126/343.5 A X |
| 3,080,863 | 3/1963 | Stolle | 126/343.5 A |
| 3,093,936 | 6/1963 | Figge | 126/343.5 A |
| 4,003,693 | 1/1977 | Straitz | 431/351 |
| 4,013,395 | 3/1977 | Wormser | 431/9 |
| 4,074,707 | 2/1978 | Perelman | 126/343.5 A |
| 4,078,550 | 3/1978 | Haffenden | 126/343.5 A |

FOREIGN PATENT DOCUMENTS

| | | | |
|---|---|---|---|
| 987037 | 4/1951 | France | 126/343.5 A |
| 741503 | 12/1955 | United Kingdom | 126/343.5 A |
| 755158 | 8/1956 | United Kingdom | 126/343.5 A |

Primary Examiner—Stephen P. Garbe
Attorney, Agent, or Firm—Ralph S. Branscomb

[57] ABSTRACT

An apparatus for melting solids which is particularly designed to melt tar billets without overheating and thus causing pyrolysis of the solid tar. The apparatus in its principal embodiment utilizes a solid horizontal plate having a plurality of parallel ridges separated by parallel fluid conducting channels, the plate being heated from beneath by a special burner arrangement and causes the tar to melt and then drain into a collector trough rather than remain adjacent the heating surface. The apparatus utilizes vertical feed tar billets which are forced against the melting plate under action of gravity with or without auxillary pressure applying means, and a specialized burner, manifold and stack structure provide for proper removal of burned gases while allowing the easy loading of the vertically stacked tar billets.

6 Claims, 17 Drawing Figures

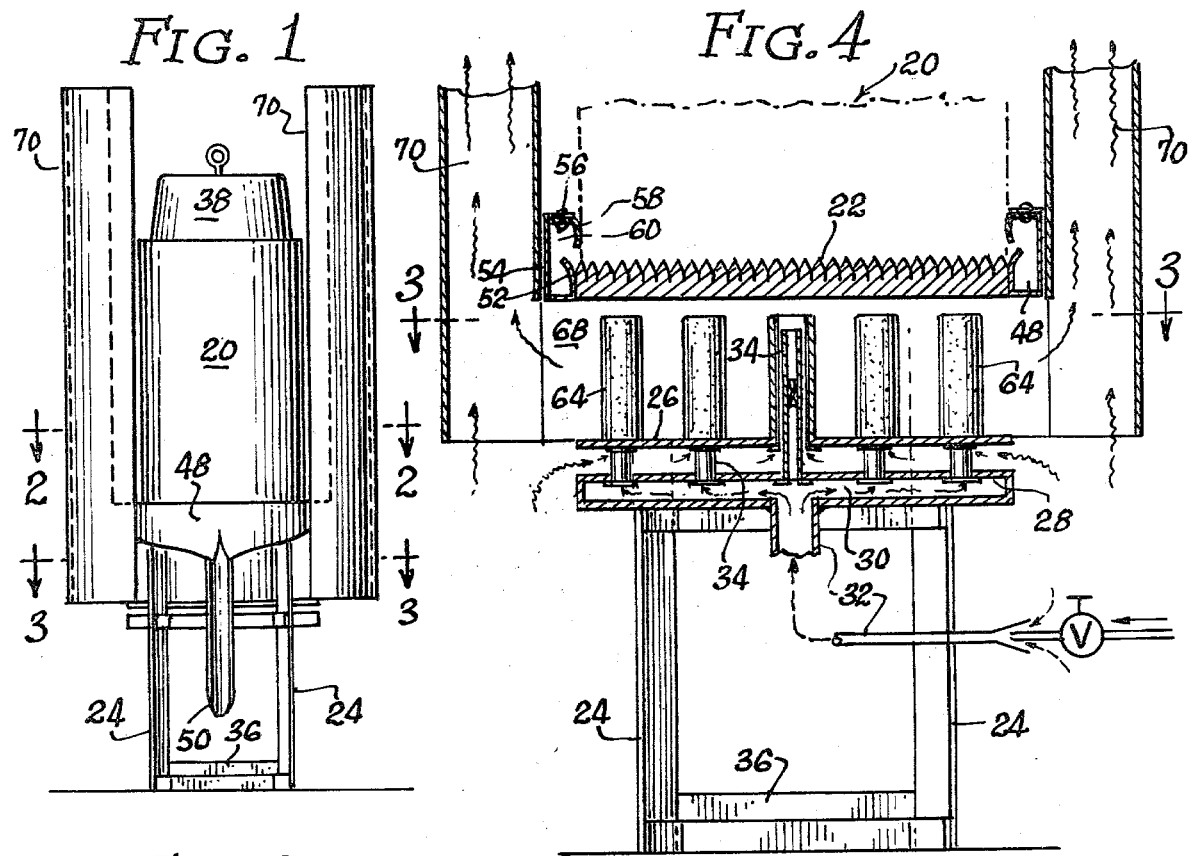
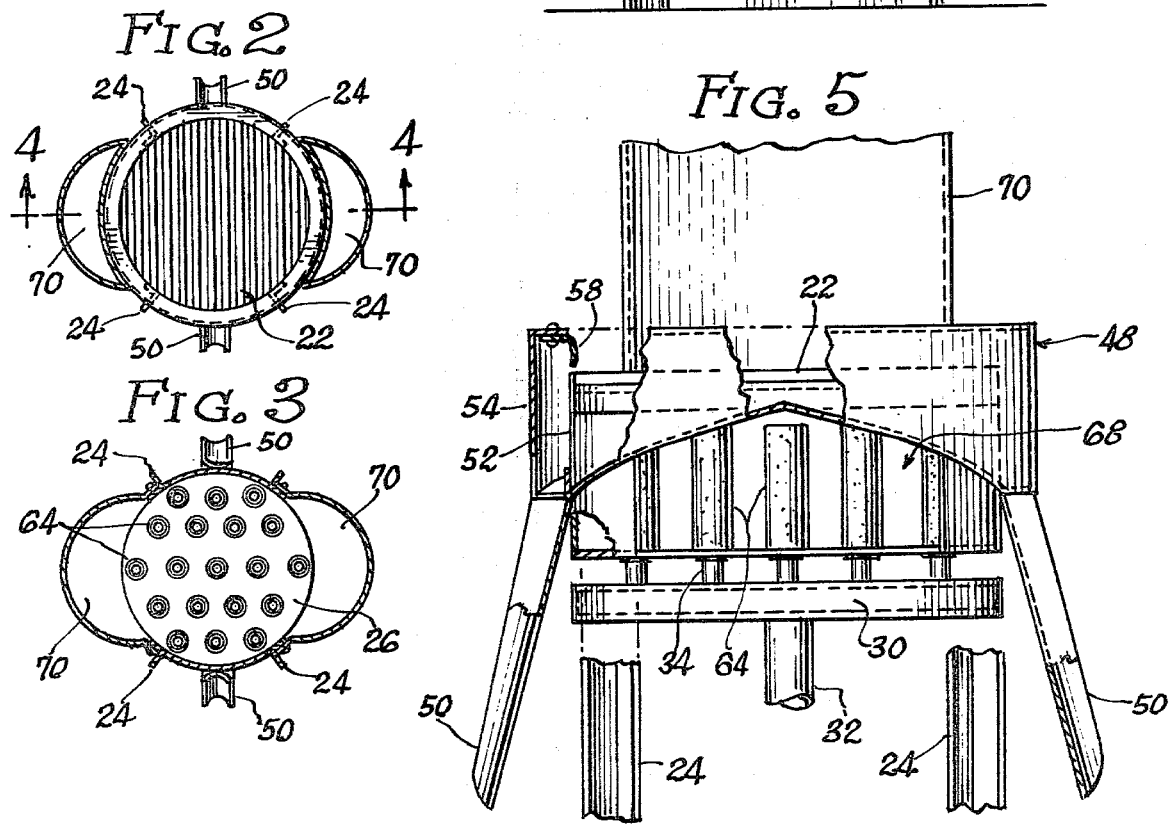

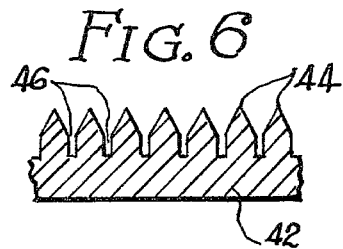
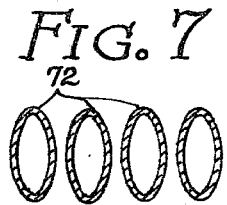
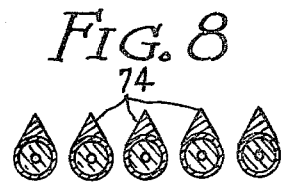
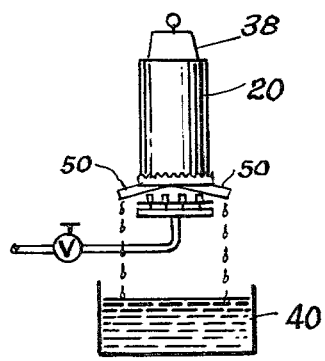
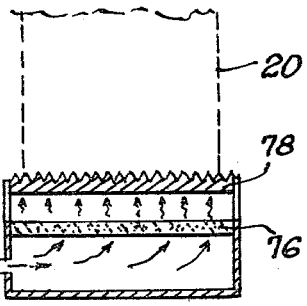
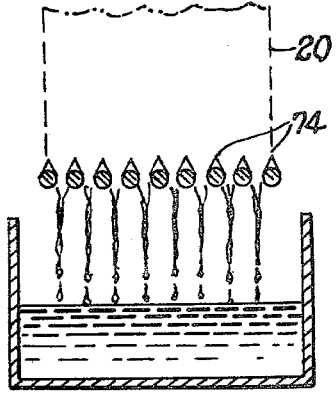
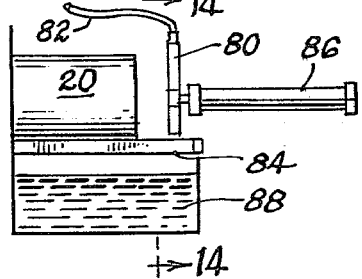
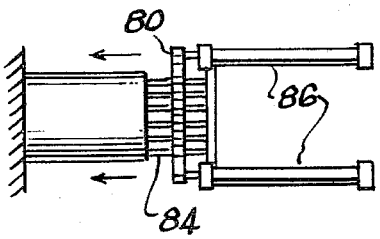
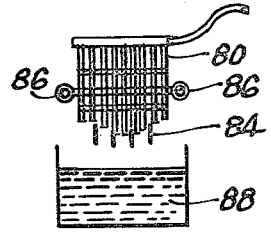
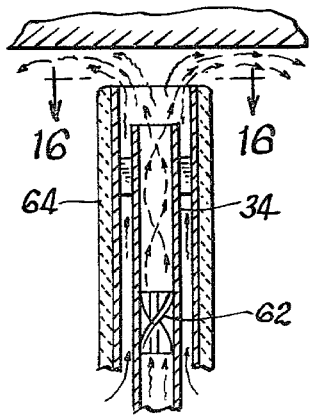
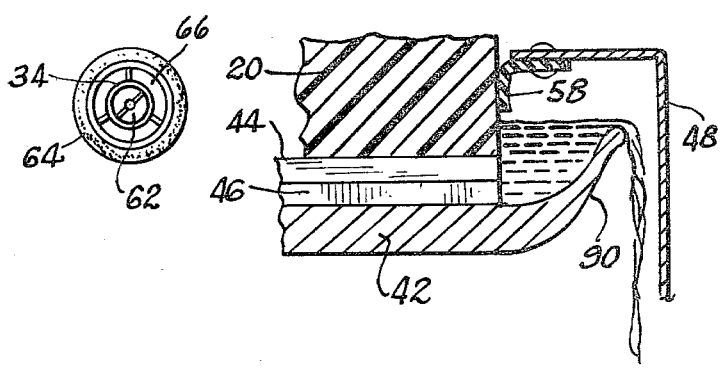

DIRECT FLAME HEATED GRIDWORK

BACKGROUND OF THE INVENTION

One of the most practical and effective methods of sealing roof tops, and in fact producing roofing surfaces, is the application of hot tar which may be used with a layer of felt material. The process involves the melting of the tar which in many cases is accomplished at the roofing site. The tar is provided in solid billets which are ordinarily cylindrical and wrapped in a tough paper sheathing, which is removed and the billet is inserted into a heating kettle.

The heating kettle currently exclusively sold and used in the hot tar application trade is quite simple in concept, having a large reservoir or kettle through which passes a hollow pipe. The hollow pipe is the heating element and is heated by means of hot gases from a burner which represents an integral part of the mobile kettle apparatus. If there is already tar in the kettle which has solidified, it may take several hours for this pipe to warm the tar sufficiently to melt it. Because the tar is quite a good insulator, the heating pipe is ordinarily heated to a very high temperature so that the tar melts as quickly as possible.

There is no means of circulating the tar within smaller heating kettles, and a circulating pump may be used in the larger ones. In either case, there is a tendency for the tar adjacent the super heated gas pipe to pyrolize or crack, which involves, the essence, the producing of small molecules from large molecules with the result that the smaller, more volatile molecules are released into the atmosphere as a pollutant. An excellent study of this phenomenon is detailed in a publication of The Asphault Institute entitled EVALUATION OF EMISSIONS FROM ASPHAULT ROOFING KETTLES WITH RESPECT TO AIR POLLUTION by J. F. Thomas, Ph.D., of the University of California at Berkeley (April 1975). By raising the temperature only to the required working temperature, and not super heating the already melted liquid, it was found that the bulk of the fumes and solids otherwise emitted are contained in the kettle.

Although the pollution problem as well as the associated problem of coking (i.e., deposition of hard carbon deposits), of the tar on the heating pipe, represents the principal drawback of conventional tar kettles, another problem lies in the practical inability of the apparatus to be used in making small quantities of hot tar. Because approximately ¾ of the kettle must be full in order to cover the heater pipe, and because the heating pipe must be covered to avoid fires (flashing), only large quantities of the tar may be heated at a time.

SUMMARY OF THE INVENTION

The present invention is a heating and melting device designed for use with tar billets, but adaptable to other melting and heating purposes. A heating element or member is used which comprises a metal plate, the upper surface of which defines a plurality of parallel tapered-topped ridges separated by open channels. The tapered ridges serve to conduct heat from an underlying gas burner evenly and effectively to the tar in an overlying tar billet, and the channels conduct the liquified tar to a collecting trough which rings the heating plate. Gravity and the pressure applied to the tar billet against the heater plate effectively forces the liquid tar through the channels and off the plate edges into the trough, from which two outlets drain the tar into buckets or other utility containers.

The very design of the system, having a solid tar billet weighted or otherwise forced downward against a heated plate having drainage channels, causes the liquid tar to be extricated from the hot plate immediately upon liquifying so that it is not permitted to build up excessive heat and pyrolize. A special arrangement of gas burning nozzles beneath the heated plate permits an extraordinarily rapid transfer of heat from the gas flames into the metallic plate so that the melting process takes place briskly.

In addition to melting any quantity of tar desired without overheating or fire danger, further pollution reduction is accomplished by means of a seal adjacent the edge of the heating plate which has a resilient skirt which bares against the down-feeding tar billet as it is consumed, thus trapping any fumes within the apparatus and at the same time preventing the entry of oxygen into the area adjacent the plate which in turn prevents oxidation of and loss of volatiles from the tar and consequent caking on the collection mechanism when the heating is stopped. Another advantage lies in the inherent ability of the apparatus to produce as little tar as desired at any particular time, or to produce a continuous, unending stream if large quantities are needed.

BRIEF DESCRIPTION OF THE DRAWINGS

FIG. 1 is a front elevational view of the apparatus;

FIG. 2 is a sectional view taken along lines 2—2 of FIG. 1 but with the tar billet of FIG. 1 removed;

FIG. 3 is a sectional view taken along lines 3—3 of FIG. 1;

FIG. 4 is a sectional view of the apparatus taken along lines 4—4 of FIG. 2;

FIG. 5 is an end elevational view of the apparatus seen from the right side of the orientation of FIG. 1 revealing the shape of the collecting collar;

FIG. 6 is a detail in section of the heating plate construction;

FIG. 7 is a sectional view of an alternative heating member which utilizes parallel oval hot fluid containing pipes;

FIG. 8 is a sectional view of a detail of a further modification of the heating element utilizing electrical heating elements;

FIG. 9 is a diagrammatic illustration of the operation of the device;

FIG. 10 illustrates an alternative heating member;

FIG. 11 diagrammatically illustrates the melting operation utilizing the electric heating grid of FIG. 8;

FIG. 12 is a side elevation view of an alternative arrangement of the apparatus;

FIG. 13 is a top elevation view of an alternative arrangement of the apparatus of FIG. 12;

FIG. 14 is a sectional view taken along lines 14—14 of FIG. 12;

FIG. 15 is a detail of a sheathed gas nozzle having portions cut away;

FIG. 16 is a top elevation view of a complete nozzle and sheath taken along line 16—16 of FIG. 15;

FIG. 17 is a fragmentary vertical section view of modified melting plate having a retaining dam which allows a positive shutoff of the liquid flow when heat is removed.

DETAILED DESCRIPTION OF THE PREFERRED EMBODIMENT

In the preferred form of the invention, the apparatus is utilized by inserting a tar billet into the apparatus from the top so that its weight presses it against the upper surface of a heating member or plate 22. This plate is supported by means of its attachment to four support legs 24. It can be seen from FIG. 2 how these legs are connected directly to the heating plate 22.

Also connected to these legs by the same technique of bolting or riveting, etc., is a nozzle sleeve mounting plate 26, which will be discussed in somewhat more detail below, and the nozzle mounting plate 28. The nozzle mounting plate 28 serves as the top of the gas supply manifold 30 which by virtue of gas supply pipe 32 feeds a number of upright nozzles 34. Braces 36 reinforce the support legs, and of course, any appropriate structure can be arranged in any suitable fashion to support the elements just mentioned in lieu of the above described legs.

FIG. 9 is a diagrammatic illustration of the operation of the apparatus, wherein the tar billet 20 is forced down against the hot plate by means of gravity, gravity in conjunction with a supplemental weight 38 as shown in FIG. 1, or gravity aided by a mechanical pressure applying means or hydraulic ramrod, etc. Ideally, the force on the billet would be easily variable so that it could be adjusted to account for the diminishing weight of the billet as it grew smaller, so as to regulate the temperature of the runnoff tar. The greater the force of the tar billet against the heating plate, the more pressure on the liquid tar and the more quickly it is forced from the plate and thus, the cooler it is compared to tar permitted to remain on the plate longer. Therefore, an inverse correlation exists between tar temperature and force against the billet.

To finish the simplified explanation of FIG. 9, the asphault or tar is forced against the heating plate which is warmed by the underlying burner, and the overflow is collected in a utilization bucket diagrammatically illustrated at 40.

Turning now to some of the construction details, the heating member 22 is of great importance to the invention. A section of a detail of this plate is shown in FIG. 6. This plate has a solid backing 42 and the upper surface consists of a series of parallel ribs 44 which have tapered sides at their top portions and parallel walls in their lower extremes which define a plurality of channels 46 interstitially related with the ribs. These channels and ribs are perfectly parallel in the preferred embodiment and extend the full width of the heating plate 22. The heating plate in the embodiment shown is round simply because the tar billet used in this particular apparatus is cylindrical. It is made preferably of a solid piece of highly heat conductive metal such as aluminum so that the heat from the heater elememt below is efficiently spread and conducted to the billet.

Use of a solid plate rather than a structure made of individual tubular members such as described below and shown in FIGS. 7 and 8, allows the use of direct flame application as a heating means, while still keeping the melted material out of contact with the time. This is considerably less complicated and expensive than the external heating of a heat transfer fluid or the generation of electrical current, which subsequently flows through and heats the grid.

The action of the plate as shown in FIG. 6 is as follows: the upper, tapered portions contact increasingly deeper layers of the tar as the tar is forced down upon the plate and the outer layers are melted. The melted tar is squeezed into the channels, where it is further subject to heating limited only by the time the liquid tar remains in the channel and the plate temerature. The action of the overlying tar billet pressing down against the plate, depending on the pressure which is applied as described above, forces the liquid tar at the appropriate temperature out to the edges of the circular plate.

The drainage channels serve to relieve the back pressure in the thin viscous liquid tar layer, and thus reduce substantially the pressure on the billet required to achieve a given rate of melting. The upper triangular sections promote heat transfer by increasing the heating area in contact with a given horizontal area of the billet, further reducing the applied pressure required.

At the edges the channels are open and the liquid tar falls into a surrounding collector container 48, which is of annular plan form as shown in FIG. 2. On two sides of the apparatus, this container slopes to central collection points as best seen in FIG. 5, and each of these collection points is fitted with a chute or pipe 50 to deliver the heated tar to whatever container is appropriate for the job, diagrammatically indicated at 40 in FIG. 9. The trough 58 has an inner wall 52 which is connected to the heating plate and supports the trough, and a generally cylindrical outer wall 54 which extends up above the heating plate to define an annular flange 56 which mounts an inwardly projecting resilient skirt 58. As can be seen in FIG. 4, this skirt is biased against the tar billet but would permit the billet to slide through as it is melted and sinks lower and lower. This skirt articulates a seal which prevents entry of atmospheric oxygen into the area indicated at 60 characterized by the edge of the tar billet meeting the heating plate. Without this seal, freely entering oxygen would cause the tar to oxidize in this area and cake to the plate and trough.

The apparatus is best operated in a mode such that the heat is shut off while a few inches of tar billet still remain. Because of the action of the sealing member, the melting surfaces are then never exposed while hot, which would cause a layer of hardened oxidized, devolatilized tar to form, impairing subsequent heat transfer capability.

The purpose of the sealing structure being to eliminate oxygen from the plate and the liquid tar, variations from the above-described structure are clearly conceivably within the scope of the invention and the appended claims. One such variation would be an upwardly projecting peripheral wall mounted directly to the heating plate enclosing the feeding end of the tar billet and having a sealing skirt of some kind, similar to the skirt 58, to establish a sliding seal with the billet.

A special and unique heating system has been developed which accords with the need to deliver high quantities of heat quickly to the plate. The heating system includes, as has already been described, the intake gas manifolds 30 the top plate 28 of which mounts a plurality of nozzles 34. The nozzles, one of which is detailed in FIG. 15, are of a type set forth in U.S. Pat. No. 4,013,395 which utilize a turbine blade 62 inside the nozzle or a torch tip. These blades have a significant beneficial effect on a single torch tip, and also when used in conjunction with applicant's overall arrangement are quite effective.

The sleeve mounting plate 26 mounts a number of upright sleeves 64 which are coaxially oriented with respect to the nozzle contained within each sleeve. The nozzle and sleeve ends lie within about one inch of the heated plate and generate a thin circular sheet of very hot flame flowing radially over the plate, outward from the point where the nozzle centerline intersects the plate. The sleeves are mounted in the plate in such a way that air is free to enter between the nozzles and the sleeve in the area shown at 66 best seen in FIG. 16. The entry of air into the sleeve alongside the nozzle provides some type of back pressure relief that is not completely understood. Air flowing up the sleeves also serves to keep the turbine nozzles cool. The sleeves are best made out of ceramic to further protect the nozzles from the heat of the surrounding exhaust gases. In addition, secondary air, required by many nozzle designs, reaches the emerging flame, whereas without the sleeves it is excluded by the burning gases. In this situation, the unburned fuel would generate a large amount of diffuse flame escaping from the burner area, and effecting little heat transfer to the plate.

The result of the use of these sleeves is to permit the arrangement best shown in FIG. 4 to heat the heating plate 22 in an extremely effective manner whereas the turbine torches without these outer sleeves result in the escape of much of the heated gas prior to heat transfer. With the use of the sleeves, relatively little heat is lost as hot gas to the sides of the device, and the difference is striking when the hand is held alongside the two units while in use.

In order to carry away the hot vapors from the torches, an exhaust manifold 68 envelopes the sleeves and nozzles. This manifold opens at its ends into two vertical stacks 70 having crescent cross-sections which fit neatly into the sides of the apparatus and permit the insertion of a tar billet between them. The stacks or flues are necessary to remove the hot gases from the working area around the heater.

Several variations of different aspects of the apparatus are shown such as the ovate gas tubes 72 of FIG. 7 which together comprise a grid which replaces the heating plate 22. A similar modification shown in FIG. 8 utilizes a grid work of electrical heating elements 74. A further modification of the heating member is shown in FIG. 10 in which a relatively recently developed porous plate surfaces combustion burner 76 is described in U.S. Pat. Nos. 3,785,763; 3,248,099 and 8,824,064, is used. The porous plate is of such a nature that the oxidation of the hot gases actually takes place on the surface of the plate itself, causing it to heat to radiant temperature and thus radiate to the overlying plate 78. FIG. 11 is a diagrammatic illustration of the manner in which a tar billet might be placed on the heating elements of the grid shown in FIG. 8 and melted into an underlying container.

The apparatus thus shown and described can also be implemented in a horizontally extended modification shown in FIGS. 12 through 14. In this embodiment, a metal plate 80 similar to plate 22 is utilized, with the probable exception that the plate would have integral hot gas pipe structure similar to the pipe 72 in FIG. 7. Hot gas or liquid communicated through tubes 82 heat the plate 80 to sufficient temperature. The tar billet 20 in these figures rests on parallel rails 84 and it is the plate 80 which is moved by pneumatic or hydraulic mechanism 86 against the tar billet which causes the latter to melt. The melt tar drips through the rails and into underlying container 88. The sequence in FIGS. 12 through 14 illustrates two facts, first that the general principal set forth in regard to the principal embodiment can also be implemented in a horizontally extended orientation. Second, it is entirely possible that the heating plate be moved relative to the tar billet rather than vice versa.

A retaining dam structure such as peripheral ridge 90 shown in FIG. 17 could be incorporated around the edge of the plate to immediately stop the flow of tar upon the extermination of the heat source and removal of pressure from the tar billet. After the major portion of the tar billet has been consumed, the seal 58 is ideally tight enough to support the remaining few inches of billet above the plats, so no pressure is applied to the fluid below if the auxillary force 38 is removed. The peripheral ridge is made high enough above the heating plate (one-quarter to one-half inch) so that residual heat in the plate will not melt the bottom of the billet up to the level of the ridge. Thus, fluid cannot flow over the ridge. If desired, an auxillary support device could be used to support the billet above the plate in the event the remaining portion of the billet is too heavy to be completely supported by the skirt 58.

The invention as disclosed and claimed is subject to minor variations within the overall inventive concepts, which are intended to fall within the appended claims. The heating plate 22 could vary in design to the extent of having projections such as pyramids or spikes rather than ribs, and other waffle-type configurations are conceivable. In addition, the plate could be disposed at an angle rather than horizontal to promote drainage, or could be cone-shaped to effect the same results. Other modifications in contour and slope are conceivable for various purposes.

In any of its various embodiments, the apparatus disclosed herein provides a simple means of delivering tar at any practical temperature and in any desired quantities without producing toxic fumes and without causing overheating, oxidation or caking of the tar during and immediately subsequent to the heating operation. It is also light and portable and easily raised to a roof. It can be mounted on a variety of other equipment, such as on trailerable tar kettles, roofing felt applicators, and road patching devices. A simple and inexpensive solution is provided to a problem whose time has come.

I claim:

1. A top-loading vertical feed tar billet melting apparatus comprising:
    (a) a heating member comprising a substantially plane-defining solid plate braced to support a gravity-fed tar billet thereon and dimensioned to span the end of an end feeding tar billet said heating member comprising a solid heat conducting plate having a gas burner heat source therebelow;
    (b) a collector container comprising a trough disposed adjacent said heating member and beneath the edges of said plate such as to collect the runoff of hot tar therefrom;
    (c) a sealing member establishing a sliding seal between the sides of an infeeding tar billet and said collector container to substantially prevent the passage of atmospheric air from around said tar billet into contact with melted tar on said heating member; and
    (d) said trough having an outer wall defining a continuous vertical collar extending upwardly beyond said plate, and said sealing means comprising a skirt mounted to said collar and extending into bearing relationship against the sides of a tar billet supported on said plate.

2. A tar billet melting apparatus comprising:
(a) A heating member dimensioned to span the end of an infeeding tar billet said heating member comprising a solid heat conductive plate having a gas burner heat source therebelow;
(b) a collector container disposed adjacent said heating member such as to collect the runoff of hot tar therefrom;
(c) a sealing member establishing a sliding seal between the sides of an infeeding tar billet and said collector container to substantially prevent the passage of atmospheric air from around said tar billet into contact with melted tar on said heating member; and
(d) said melting apparatus includes a manifold to collect burned gases from said burner and a pair of stacks extending upwardly from said manifold, said stacks being spaced to permit a tar billet to be loaded therebetween onto said plate.

3. A tar billet melting apparatus comprising:
(a) A heating member dimensioned to span the end of an infeeding tar billet said heating member comprising a solid heat conductive plate having a gas burner heat source therebelow;
(b) a collector container disposed adjacent said heating member such as to collect the runoff of hot tar therefrom;
(c) a sealing member establishing a sliding seal between the sides of an infeeding tar billet and said collector container and said heating member to substantially prevent the passage of atmospheric air from around said tar billet into contact with melted tar on said heating member; and
said heating member comprises a horizontally extended plate of planform dimension sufficient to span the end of an infeeding tar billet and including a continuous dam integral with said plate and extending above same and defining a hot tar reservoir atop said plate thereby halting the drainage of hot tar when the billet is restrained.

4. An apparatus for melting a solid comprising:
(a) a conductive solid heating place having a plurality of raised portions to conduct heat into a solid, said raised portions comprising generally parallel ribs having tapered tops and generally vertical descending lower sides defining a plurality of channels to conduct liquid melted from said solid away from said raised portions;
(b) a gas burner heat source for applying heat directly to said heating plate;
(c) a collector container disposed beneath the ends of said channels to catch the liquid conducted by said channels; and
(d) said plate being shaped in planform to accommodate a billet cross section, said channels extend to the edge of said plate, and said collector container comprises a generally continuous trough disposed beneath the edge of said plate.

5. An apparatus for melting a solid comprising:
(a) a conductive solid heating plate having a plurality of raised portions to conduct heat into a solid, said raised portions comprising generally parallel ribs having tapered tops and generally vertical descending lower sides defining a plurality of channels to conduct liquid melted from said solid away from said raised portions;
(b) a gas burner heat source for applying heat directly to said heating plate;
(c) a collector container disposed beneath the ends of said channels to catch the liquid conducted by said channels;
(d) said plate being horizontally extended to support a vertically fed solid billet;
(e) said channels having open ends to pour out liquid conducted through said channels;
(f) said collector container comprises a trough mounted to said plate suspended beneath said open end; and
(g) said trough has an outer wall extended upwardly above said plate and having a sealing skirt mounted to said wall to bear in sliding sealed relationship against said solid billet as same feeds against and is melted by said plate.

6. An apparatus for melting a solid comprising:
(a) a conductive solid heating plate having a plurality of raised portions to conduct heat into a solid, said raised portions comprising generally parallel ribs having tapered tops and generally vertical descending lower sides defining a plurality of channels to conduct liquid melted from said solid away from said raised portions;
(b) a collector container disposed beneath the ends of said channels to catch the liquid conducted by said channels; and
(c) a gas burner heat source for applying heat directly to said heating plate comprising:
 (i) a conductive plate;
 (ii) a plurality of generally parallel gas burner nozzles spaced from and directed toward said plate;
 (iii) each of said nozzles having a coaxially journaled impeller therein; and
 (iv) each of said nozzles having a radially spaced coaxial sleeve mounted thereto overlapping the ends of the respective nozzles, said sleeves communicating with a fresh air source to provide available air to the tips of said nozzles.

* * * * *